United States Patent [19]

Comert et al.

[11] Patent Number: 4,725,641
[45] Date of Patent: * Feb. 16, 1988

[54] THERMOPLASTIC PRESSURE-SENSITIVE ADHESIVE COMPOSITION

[75] Inventors: Ahmet Comert, Chaineux; Dominique Petit, Housse-Blegny, both of Belgium

[73] Assignee: Norton S.A., Strombeek-Bever, Belgium

[*] Notice: The portion of the term of this patent subsequent to May 6, 2003 has been disclaimed.

[21] Appl. No.: 821,847

[22] Filed: Jan. 23, 1986

Related U.S. Application Data

[63] Continuation-in-part of Ser. No. 535,827, Sep. 26, 1983, Pat. No. 4,587,289.

[30] Foreign Application Priority Data

Sep. 27, 1982 [FR] France ................................. 82 16218

[51] Int. Cl.$^4$ ........................... C08L 9/06; C08L 77/12
[52] U.S. Cl. ..................................... 524/499; 524/505; 525/89; 525/92
[58] Field of Search ................... 524/505, 499; 525/89, 525/92

[56] References Cited

U.S. PATENT DOCUMENTS

| | | | |
|---|---|---|---|
| 3,839,245 | 10/1974 | Schlossman et al. | 260/18 N |
| 4,011,286 | 3/1977 | Seymour et al. | 260/873 |
| 4,110,411 | 8/1978 | Imanaka et al. | 260/873 |
| 4,112,020 | 9/1978 | Callan | 260/873 |
| 4,130,603 | 12/1978 | Tanaka et al. | 260/860 |
| 4,138,378 | 2/1979 | Doss | 260/27 |
| 4,169,822 | 10/1979 | Kutch et al. | 260/27 |
| 4,181,635 | 1/1980 | Takamatsu et al. | 260/5 |
| 4,218,549 | 8/1980 | Jadamus et al. | 525/420 |
| 4,230,838 | 10/1980 | Foy et al. | 525/408 |
| 4,242,470 | 12/1980 | Gergen et al. | 525/92 |
| 4,268,570 | 5/1981 | Imanaka et al. | 428/216 |
| 4,325,770 | 4/1982 | Korpman | 156/230 |
| 4,327,726 | 5/1982 | Kwong et al. | 128/272 |
| 4,587,289 | 5/1986 | Comert | 524/505 |

FOREIGN PATENT DOCUMENTS

| | | |
|---|---|---|
| 0009951 | 4/1980 | European Pat. Off. . |
| 2075990 | 5/1980 | United Kingdom . |
| 2090607 | 7/1982 | United Kingdom . |

OTHER PUBLICATIONS

Search Report Appln. No. FR 82 16 218.
"Analysis of Rubber and Rubber-like Polymers", *Applied Science Publications*, Third Edition.

*Primary Examiner*—Patricia A. Short

[57] ABSTRACT

The invention relates to a thermoplastic pressure-sensitive adhesive composition.

The thermoplastic pressure-sensitive adhesive composition according to the invention comprises as essential elements a styrene-isoprene-styrene elastomer, at least one tackifying resin selected from aliphatic hydrocarbon, C8-aromatic and terpenephenolic resins and a block copolymer with elastomeric and rigid segments selected from copolyetheresteramides and copolyetheresterurethanes. It further preferably comprises a tackifying naphthenic oil and fillers.

The composition according to the invention is particularly useful for bonding decorative streeps, protective rubber trims, mirrors, etc to panel bodies of painted cars and is therefore resistant to heat and gasoline.

2 Claims, No Drawings

THERMOPLASTIC PRESSURE-SENSITIVE ADHESIVE COMPOSITION

This application is a continuation-in-part of copending application Ser. No. 535,827 filed Sept. 26, 1983, now U.S. Pat. No. 4,587,289.

The present invention relates to thermoplastic compositions exhibiting pressure-sensitive auto-adhesive properties, i.e. compositions commonly called "pressure-sensitive hot melt" which in addition have a good resistance to hydrocarbons.

Hot melt techniques are extremely diversified and range from the weakest types of glue bonding, for example in the cardboard trade, to the most difficult types of sealing, such as joining metal to metal, metal to glass and glass to glass.

The pressure-sensitive hot melts of the present invention can be used in all the applications where the known double-face adhesives are used. These generally have the form of sheets or ribbons of a cross-linked elastomeric foam or polyethylene foam with an adhesive, usually of the acrylic type on both sides. For critical uses such as bonding decorative ribbons on car body panels, the adhesive covering the two sides of the foam is also cross-linked. Thus the composite sheets or ribbons are formed of three or five or even more layers. They bond quite well to polar surfaces, but in the absence of a primer they are totally inefficient on non polar surfaces. Moreover, they are less economic when used on an industrial scale, because they are sold cut to certain dimensions and thicknesses and therefore require huge stocks in order to have a sufficient choice availabe for different uses. Besides, the ribbons are usually sold in the form of reels of a limited length, usually of 60 to 100 meters. Recently some reels were marketed of up to 600 to 700 meters, but even that is limited and awkward to stock.

These drawbacks are met with in the present invention by providing a "pressure-sensitive hot melt" which, by means of a simple apparatus, can be applied at any desired dimension or thickness which is determined at the moment of application itself and does not need to be selected from among a certain number of ribbons of preexisting dimension. Besides, the stock of this pressure-sensitive hot melt is constituted of simple barrels of 20, 50 or 200 liters. The user just sets the desired breadth and thickness on the applicator and the hot melt is drawn from the barrel without the least waste.

Moreover, the pressure-sensitive hot melt of the present invention is specially designed for bonding objects to metals, in particular for bonding objects to painted panel bodies of automotive cars.

As is well known there is an ever increasing need for an adhesive that allows the application of decorative or functional objects such as decorative streeps, protective rubber trims, mirrors, etc on the panel bodies of painted cars. Such an adhesive must withstand static shear at relatively high temperature, for example when the car stands in the summer sun, as well as the action of solvents such as gasoline, without losing its properties, i.e. it must be thermoplastic and yet remain sticky and resist to solvents besides having such a viscosity and such rheological properties as to be pumpable from the barrels to the surface on which it is to be applied.

The object of the present invention is therefore to provide a pressure-sensitive hot melt with improved resistance to hydrocarbons and to static shear.

The thermoplastic pressure-sensitive adhesive composition of the present invention comprises as essential elements:

(1) 100 parts of a resistance to shock and to polar substrate and adhesion improving styrene-isoprene-styrene block copolymer having a melt index of 0.2 to 22 g per 10 minutes;

(2) 50 to at least 500 parts of at least one tackifying resinous constituent selected from the group comprising:
   (a) 50 up to 500 parts of aliphatic hydrocarbon resin, having a softening point (ring and ball) of about 100° C.,
   (b) up to 300 parts of C8-aromatic resin, terpenephenolic resin, or a combination thereof, having a softening point (ring and ball) of up to 200° C., (3) 1 to 300 parts of a block copolymer selected from the group comprising:
   (a) a copolyetheresteramide consisting of a product resulting from the polycondensation of an α,ω-dicarboxylic polyamide or copolyamide having a number average molecular weight of 300 to 15,000, employed in an amount of 90 to 5% by weight and of an aliphatic α,ω-dihydroxylated polyoxyalkylene having a number average molecular weight of 100 to 6,000, employed in an amount of 10 to 95% by weight, the said polycondensation product having a softening point (ring and ball) of between 80° and 210° C. and a viscosity in the molten state of 10 to 2,000 Pa.s at 200° C.; and
   (b) a copolyetheresterurethane having a Shore A hardness according to ASTM D-2240 of 60 +/−20, an elongation at break of 425 to 600 and a softening point (ring and ball) of 190° to 230° C.

(4) up to 200 parts of tackifying naphtenic oil;

(5) up to 300 parts of fillers.

The styrene-isoprene-styrene block copolymer present in the hot melts of the invention constitutes the elastomer base, the purpose of which is to absorb shocks at low temperature and to form a barrier to water and water vapor, in addition to keeping the so-called tackifiers in dispersion, the tackifiers being the agents which give a tacky character to the mixture into which they are incorporated. The specific compositions according to the present invention contain 100 parts by weight of one or more elastomer styrene-isoprene-styrene constituent having an average number molecular weight of 15,000 to 200,000 or 300,000 or more. The block copolymer used in the present invention is any styrene-isoprene-styrene (abbreviated as SIS) copolymer having a styrene/isoprene ratio of from 10/90 to 50/50, a specific gravity of 0.92 to 0.95 g/cm3, a melt index according to ASTM D 1238-65 T condition "G" of 0.2 to 22 g par 10 minutes, a viscosity in 25% solution in toluene, using a LFV Brookfield viscosimeter, rotor No. 3 at 6 r.p.m., of 300 to 20,000 cP (0.3 to 20 Pa.s), a Shore A hardness (30 seconds) of 30 to 75, a tensile strength of 12 to 33 MPa and an elongation at rupture of 820 to 1300%. An example of such a SIS elastomer is Cariflex ® 1107 of Shell C°.

The tackifying resins form the second class of functionally important constituents of the hot melts of the invention. They are chosen, in particular from amongst the following types:

(a) Aliphatic hydrocarbon resins having a softening point (ring and ball) of about 100° C., of the kind described in U.S. Pat. No. 4,294,733, for example the resin Escorez ® (Esso) used in an amount of up to 500 parts, preferably from 100 to 165 parts per 100 parts SIS elastomer. Other suitable resins are Imprez ® (ICI) and Arkon ® (Arakawa).

It is generally advantageous for at least part of the amount of resinous constituents of the hot melts according to the invention to be represented by one or more aliphatic hydrocarbon resins. It is the resins of this kind, in particular, which constitute the tackifiers of the composition.

(b) Aromatic resins (polymers of C8 cuts) or terpenephenolic resins having a softening point (ring and ball) of 110 up to 200° C., for example the resin Nirez ® having a softening point of 150° C., taken in an amount of up to 300 parts and preferably of about 100 parts. Other suitable resins are SP 560 (Schenectady), Dertophene ® (DRT), Hercurez ® (Hercules), Piccofyn ® (Hercules). The amounts used of these resins may vary from 0 to 300 parts according to the desired adhesiveness.

The relative amount of these constituents can vary within fairly wide limits according to the resins used and the particular properties which it is desired to impart to the hot melt.

As a general rule, all the resinous constituents incorporated into the composition will represent from 50 to 1,000 parts and advantageously from 100 to 500 parts per 100 part of SIS elastomer.

The third class of essential constituents of the hot melts according to the invention is formed by block copolymers with a rigid and an elastomeric segments. The preferred block copolymer is a copolyetheresteramide as disclosed in U.S. Pat. Nos. 4,230,838 and 4,361,680. This is a product which results from the polycondensation of an α,ω-dicarboxylic polyamide or copolyamide having a number average molecular weight of 300 to 15,000, employed in an amount of 90 to 5% by weight and of an α,ω-dihydroxylated polyoxyalkylene having a number average molecular weight of 100 to 6,000, employed in an amount of 10 to 95% by weight, the said polycondensation product having a softening point (ring and ball) of between 80° and 210° C. and a viscosity in the molten state of 10 to 2,000 Pa.s at 200° C. An example of such a copolyetheresteramide is sold under the Trade Mark Pebax ® by Ato.

The amount of copolyetheresteramide in the composition of the pressure-sensitive hot melts of the present invention can vary within fairly wide limits. In general the compositions will comprise from 1 to 300 parts of one or more such resins and more particularly from 10 to 150 parts.

It is mainly by virtue of the incorporation of these specific polyetheresteramides that the hot melts according to the invention have advantageous properties in comparison with analogous hot melt compositions which do not comprise these polyetheresteramides.

These polyetheresteramides incorporate regions of high cohesion incompatible with the SIS elastomeric constituent on the molecular scale, but which are miscible on the macroscopic scale.

In general, the polyetheresteramides form part of the class of the block or multiblock copolymers having elastomeric segments and rigid segments of high cohesion.

More particularly, the said elastomeric segments consist of polyols, polyethers or polyesters and the rigid segments of high cohesion consist of poly(tetramethylene terephthalate) or polyurethanes, polyamides or copolyamides.

Another block copolymer having elastomeric and rigid segments of high cohesion which is useful in the present invention is a copolyetheresterurethane. According to the blend selected, these copolymers may have a Shore A hardness according to ASTM D-2240 of 60 +/−20, a specific weight of 1.13 to 1.15 kg/dm3, a tensile strength according to ASTM D-412 at 50% elongation of 40 to 137 kg/cm2, an elongation at rupture of 425 to 600% and a softening point (ring and ball) of 190° to 230° C. An example of such a copolyetheresterurethane is Pellethane ® sold by Upjohn.

Whereas other block or multiblock copolymers having elastomeric segments and rigid segments of high cohesion would be suitable to impart to the pressure-sensitive hot melts certain advantageous properties such as resistance to sag and to-hydrocarbons, only the copolyetheresteramides and copolyetheresterurethanes also impart the absolutely necessary properties of adhesiveness, as will be seen in the Examples.

U.S. Pat. No. 4,112,020 discloses a hot melt sealant composition comprising a partially grafted mixture of a butyl rubber together with another elastomer, preferably a quaternary styrene-ethylene-butylene-styrene (SEBS) block copolymer and/or a crystalline polymeric resin (preferably an EVA resin), and a thermoplastic segmented copolyetherester elastomer.

This last polyetherester does indeed contain elastomeric segments such as poly-tetramethyleneetherglycol terephthalate and hard segments such as butanediol terephthalate. An example of such a resin is sold under the Trade Mark Hytrel by du Pont. Although this imparts sufficient sag and solvent resistance to the hot melt, its adhesiveness is insufficient as will be seen in the Examples. Moreover, if the main constituents of this U.S. patent are used in place of the main constituents of the present invention, an excellent resistance to hydrocarbons is obtained but the peel test and the dynamic shear test give nil results and tack is practically inexistant so that the sag test becomes not applicable (n.a.) because the glass plate simply does not adhere to the aluminum sheet.

The fourth class of constituents which the pressuresensitive hot melts of the invention can comprise is tackifying naphthenic oils. Examples of such oils are Enerthene ® (BP) and Coray ® (Esso). The addition of these oils depends on the final adhesiveness which it is desired to obtain and their amount could be up to 300 parts.

The fifth class of constituents which the pressure-sensitive hot melts of the invention may comprise is fillers. According to the properties which it is desired to impart to the hot melts, fillers may be organic, such as carbon black, taken in an amount of up to 300 parts and preferably 50 to 150 parts, or inorganic, such as chalk, talc, titanium dioxide, asbestos fibers, clay, silica, inter alia, the addition of which is optional and can amount to 300 parts.

The pressure-sensitive hot melts may further contain plasticizers, such as atactic polypropylene, (residues of the stereospecific polymerization of propylene according to the Ziegler/Natta process), used in an amount of 0 to 200 parts; polybutenes (polymerization products of C4-monoolefins), used in an amount of 0 to 500 parts, such as Hyvis ® (BP) or Indopoll ® (Amoco).

The pressure-sensitive hot melts can also contain stabilizers and additives making it possible to optimize the properties of the product according to requirements. Any stabilizer commonly used for rubbers, plastics and resins could be suitable such as Irganox 1010 ® (Ciba-Geigy) and/or zinc dibutyldithiocarbamate, in an amount of 0 to 20 parts and preferably 3 to 5 parts.

The bond with various materials can be improved by means of organosilanes, which may or may not be coupled with another resin such as an epoxy resin. These organosilanes may be used in amount of 0.5 to 30 parts, if present.

DESCRIPTION OF THE TEST METHODS USED

A. Peel strength at 90°

An aliquot of the pressure-sensitive hot melt is extruded between two siliconed plastic foils and is squeezed to a ribbon of 25 mm width and 1 mm thickness under a press at 100° C.

The ribbon thus obtained is then cut into the desired dimensions with a heated knife. The obtained sample is left to rest for about one hour and then applied on a metal painted sheet-iron at ambient temperature.

A fiberglass reinforced ribbon which is adhesive on one side is stuck on the whole length of the sample. After 2 hours rest at ambient temperature, peeling is realized by means of an Instron apparatus. Traction takes place at a constant speed of 100 mm/min at an angle of 90° between the painted sheet and the direction of traction of the reinforced adhesive. The strength of traction is recorded in function of time. The Instron apparatus traces a graph which rises rather quickly and then reaches a platform indicating the peel strength of the sample. The average strength per cm width of the sample is given in the Tables below.

The higher the strength, the better is the sample.

B. Dynamic shear

A square of 25 mm side length is cut out of the same ribbon as for the peel test (A). This is then applied in the same conditions as described in A on the metal painted sheet-iron and the upper surface of the sample is covered with a 0.4 mm thick aluminum foil. After 2 hours rest at room temperature, shear is realized by means of an Instron apparatus at a constant speed of 10 mm/min. The maximum strength recorded per cm2 of surface is given in the Tables below.

The higher the maximum strength, the better is the sample.

C. Static shear (sag) at 65° C.

An aliquot of the pressure-sensitive hot melt is extruded between two siliconed plastic foils and squeezed under pressure at 100° C. to a 4 mm thick ribbon.

A 75 mm long and 30 mm wide sample is cut out and, after one hour rest, it is applied between an aluminum sheet and a 75 mm wide, 150 mm long and 4 mm thick glass plate weighing about 170 g in such a way that the glass plate is attached on the wide side of the sample and at one of its ends. The sample is then placed in an oven. The aluminum sheet is fixed to one of the walls of the oven and the glass plate remains suspended to the sheet by means of the sample. The oven is heated to 65° C. and the displacement of the glass plate resulting from the sag of the sample under the weight of the glass is recorded after 7 hours. This displacement is given in the Tables below.

The less the displacement, the better is the adhesion.

D. Tensile strength

A 4 mm thick and 12 mm wide strip is cut out of the ribbon realized for the sag test. On each end of the strip a fibreglass reinforced sheet which is adhesive on one side is stuck in such a way that the free length of the sample is limited to 10 cm. This adhesive allows fixing the sample to the grips of the Instron apparatus. After 2 hours rest, the sample is stretched at a constant speed of 500 mm/min. The tensile strength is recorded in function of time. The results given in the Tables below represent the strength recorded after 50% elongation, i.e. an elongation of 5 cm.

The longer the time, the better is the sample.

E. Nephelometry in gasoline

This test measures the degree of dissolution of a sample in gasoline. It consists in measuring the time needed for dispersing the carbon black of a sample to render the solution opaque. A cube of 1 cm side length is immersed in a 250 ml beaker containing 200 ml gasoline, which is stirred by means of a 43 mm long magnet bar with a diameter of 0.5 mm, turning at a speed of about 150 r.p.m..

When a white paper sheet is no more visible through the beaker, the chronometer is stopped and the time recorded in seconds is given in the Tables below.

The longer the time, the better is the sample.

F. Tack

This is measured by finger touch of the adhesive. The following symbols are used in the Tables below to indicate the degree of tack:

xxx = very strong tack; xx = strong tack; x = medium or low tack; - = weak or inexistant tack.

Although simple, this test is primordial to indicate whether a sample of a pressure-sensitive hot melt is tacky or not at all. Even if all other criteria were excellent, a hot melt without tack is useless as an adhesive.

The invention is illustrated by the specific Examples hereinafter.

EXAMPLE 1

In order to illustrate the influence of the base elastomer on the adhesive power of the whole composition, various hot melts with increasing elastomer contents are prepared as given in Table I. Their adhesion-cohesion caracterstics are measured and given in Table II.

TABLE I

| COMPOSITION OF THE HOT MELTS (PARTS) | | | | |
|---|---|---|---|---|
| HOT MELT | A | B | C | D |
| SIS elastomer (Cariflex) | 0 | 30 | 100 | 300 |
| Copolyetheresteramide (Pebax) | 75 | 75 | 75 | 75 |
| Hydrocarbon resin (Escorez) | 100 | 100 | 100 | 100 |
| Terpene-phenolic resin (Nirez) | 50 | 50 | 50 | 50 |
| Naphthenic oil (Enerthene) | 25 | 25 | 25 | 25 |
| Carbon black | 50 | 50 | 50 | 50 |
| Antioxydant (Irganox 1010) | 5 | 5 | 5 | 5 |

TABLE II

| HOT MELT | A | B | C | D |
|---|---|---|---|---|
| Elastomer content (%) | 0 | 9 | 25 | 50 |
| Peel strength (N/cm) | 1 | 5 | 14 | 3 |
| Dynamic shear (N/cm$^2$) | 62 | 40 | 26 | 6 |
| Tack | — | x | xx | — |

For a good pressure sensitive adhesive, a SIS elastomer content between 9 and 25% is necessary to give at the same time a good cohesion of the mixture and optimum adhesiveness. Optimum adhesion is observed with mixture C.

EXAMPLE 2

This Example shows the effect of the block copolymers with elastomeric and rigid segments on the hot melts, where the other ingredients were kept at constant proportions. Table III gives the composition of the various hot melts. Sample A is a blank with 0% block copolymer; samples B to E have increasing contents of copolyetheresteramide according to the invention; samples F to H have increasing amounts of copolyetheresterurethane, also according to the invention; and samples I and J have increasing amounts of copolyetherester of U.S. Pat. No. 4,112,020 (not according to the invention).

Table IV gives the results of the tests obtained with these samples.

besides tack being nil even with a copolyetherester content as low as 7.5%.

Table V gives the composition of the hot melts. Samples 1 and 2 correspond to the hot melt of Example III of U.S. Pat. No. 4,112,020. As the exact kind of polyamide used is not specified in this disclosure, two kinds of polyamide 12 having a high flexibility and a low modulus of elasticity were used, namely Vestamid D 2128 and Vestamid E 4053. Samples 3 and 4 correspond to the hot melt of Example I of U.S. Pat. No. 4,112,020 using again the two kinds of polyamide.

TABLE III

| HOT MELT | COMPOSITION OF THE HOT MELTS (PARTS) | | | | | | | | | |
|---|---|---|---|---|---|---|---|---|---|---|
| | A | B | C | D | E | F | G | H | I | J |
| SIS elastomer | 100 | 100 | 100 | 100 | 100 | 100 | 100 | 100 | 100 | 100 |
| Block copolymers: | | | | | | | | | | |
| Copolyetheresteramide (Pebax) | 0 | 25 | 75 | 130 | 200 | 0 | 0 | 0 | 0 | 0 |
| Copolyether-esterurethane (Pellethene) | 0 | 0 | 0 | 0 | 0 | 75 | 130 | 200 | 0 | 0 |
| Copolyetherester (Hytrel*) | 0 | 0 | 0 | 0 | 0 | 0 | 0 | 0 | 25 | 75 |
| Hydrocarbon resin (Escorez) | 100 | 100 | 100 | 100 | 100 | 100 | 100 | 100 | 100 | 100 |
| Terpene-phenolic resin (Nirez) | 50 | 50 | 50 | 50 | 50 | 50 | 50 | 50 | 50 | 50 |
| Carbon black | 50 | 50 | 50 | 50 | 50 | 50 | 50 | 50 | 50 | 50 |
| Naphtenic oil (Enerthene) | 25 | 25 | 25 | 25 | 25 | 25 | 25 | 25 | 25 | 25 |
| Antioxidant (Irganox 1010) | 5 | 5 | 5 | 5 | 5 | 5 | 5 | 5 | 5 | 5 |

*According to U.S. Pat. No. 4,112,020

TABLE IV

| HOT MELT | PROPERTIES OF THE HOT MELTS | | | | | | | | | |
|---|---|---|---|---|---|---|---|---|---|---|
| | A Blanc | B | C | D | E | F | G | H | I | J |
| Block copolymer content | 0 | 7 | 18 | 28 | 38 | 18 | 28 | 38 | 7 | 18 |
| Tensile strength (N) | 3,1 | 3,4 | 4,7 | 17 | 34 | 6,0 | 18 | 25 | 9 | 16 |
| Sag at 65° C. (mm) | 50 | 12 | 1,8 | 0 | 0 | 1,0 | 0 | 0 | 1 | 0 |
| Resistance to hydrocarbons (Nephelometry in gasoline, seconds) | 10 | 10 | 20 | 165 | 420 | 20 | 120 | 1200 | 60 | 180 |
| Peel strength (N/cm) | 32 | 32 | 14 | 4,5 | 1,2 | 20 | 15 | 0,3 | 18 | 4,8 |
| Dynamic shear (N/cm$^2$) | 42 | 26 | 26 | 10 | 8 | 27 | 9 | 2 | 35 | 30 |
| Tack | xxx | xx | xx | x | — | xx | x | — | xx | x |

It can be seen from Table IV that increasing contents of block copolymer increase the resistance to traction both cold (strength at 50% elongation) and hot (sag) as well as the resistance to hydrocarbons. They decrease adhesion as seen from the peel strength, dynamic shear and tack. If the three block copolymers are compared with each other, it can be seen that the improvement in properties such as tensile strength and sag is independent of the chemical nature of the rigid segment (polyamide, polyurethane or polyester) because the temperature at which these tests are carried out remains below their softening points at which the links, which impart to these polymers their high cohesion, are ruptured. But whereas copolyetheresteramides and copolyetheresterurethanes still maintain a good tack up to 18% block copolymer content, this tack is particularly quickly decreased in the case of the copolyetherester of U.S. Pat. No. 4,112,020, where, with a content of 18% of the block copolymer, adhesion is already low and tends to nil with increasing amounts thereof. Thus, if samples of equal block copolymer content are compared, for example samples C, F and J having each 18% block copolymer content, it can be seen that whereas sample J has some good properties it is unsuitable as an adhesive.

EXAMPLE 3

This Example shows that if the copolyetherester of U.S. Pat. No. 4,112,020 is used together with the other components of the hot melt disclosed therein, many other properties desired for the pressure-sensitive hot melts of the present invention are lost or decreased

TABLE V

| HOT MELT | COMPOSITION OF HOT MELT | | | |
|---|---|---|---|---|
| | 1 | 2 | 3 | 4 |
| Butyl rubber | 100 | 100 | 100 | 100 |
| SEBS elastomer | — | — | 50 | 50 |
| Copolyetherester | 25 | 25 | 50 | 50 |
| Clay | — | — | 30 | 30 |
| EVA resin | 50 | 50 | — | — |
| Terpene-phenolic resin | 50 | 50 | 50 | 50 |
| Polyamide resin (Vestamid L 2128) | — | 100 | — | 100 |
| Polyamide resin (Vestamid E 4053) | 100 | — | 100 | — |
| TiO$_2$ | 5 | 5 | 5 | 5 |

TABLE VI

| HOT MELT | 1 | 2 | 3 | 4 |
|---|---|---|---|---|
| Copolyetherester content (%) | 7,5 | 7,5 | 13 | 13 |
| Tensile strength (N) | 81 | 155 | 106 | 187 |
| Sag at 65° C. (mm) | n.a.* | n.a. | n.a. | n.a. |
| Resistance to hydrocarbons (sec) | 1800 | 1800 | 1800 | 1800 |
| Peel strength (N/cm) | 0 | 0 | 0 | 0 |
| Dynamic shear (N/cm$^2$) | 0 | 0 | 0 | 0 |
| Tack | — | — | — | — |

*n.a. = not applicable: adhesion of glass plate to aluminum sheet being impossible.

From Table VI it can be seen that the hot melts of U.S. Pat. No. 4,211,020, though they have a good resistance to hydrocarbons, they completely lack adhesiveness (see sag, peel strength, dynamic shear and tack tests) and therefore they cannot be used as pressure-sensitive hot melts.

EXAMPLE 4

This Example shows that a great variety of resins commercially available can be used as the second component of the pressure-sensitive hot melts of the invention while maintaining a good tack. Table VII gives the composition of the hot melts. While maintaining the amounts of all the other ingredients constant, only the resins of the second class of constituents are varied. The hydrocarbon resins are designated by "X" and the terpenephenolic (TP) and aromatic (A) resins by "Y". Table VIII gives the results obtained with the hot melts of Table VII. It can be seen that an identical tactile reaction (immediate tack) can correspond to a variety of compositions, using either different resins or different proportions of resins or even using only one of the two types of resins "X" or "Y". These variations allow an adaptation to the specifications required by the buyers, who may insist on one or more of the criteria: peel strength, dynamic shear, etc, besides a good tack.

TABLE VII

| COMPOSITION OF THE HOT MELTS | | | | | | |
| --- | --- | --- | --- | --- | --- | --- |
| HOT MELT | A | B | C | D | E | F |
| SIS elastomer (Cariflex) | 100 | 100 | 100 | 100 | 100 | 100 |
| Copolyetheresteramide (Pebax) | 75 | 75 | 75 | 75 | 75 | 75 |
| (X) Hydrocarbon resin (Escorez) | 100 | 125 | 150 | 100 | 100 | 0 |
| (X) Hydrocarbon resin (Arkon) | 0 | 0 | 0 | 0 | 0 | 100 |
| (Y) Terp-phen (TP) resin (Nirez) | 50 | 25 | 0 | 0 | 0 | 50 |
| (Y) Terp-phen (TP) resin (Dertophene) | 0 | 0 | 0 | 50 | 0 | 0 |
| (Y) Aromatic (A) resin (Hercurez) | 0 | 0 | 0 | 0 | 50 | 0 |
| Naphthenic oil (Enerthene) | 25 | 25 | 25 | 25 | 25 | 25 |
| Carbon black | 50 | 50 | 50 | 50 | 50 | 50 |
| Antioxidant (Irganox 1010) | 5 | 5 | 5 | 5 | 5 | 5 |

TABLE VIII

| HOT MELT | A | B | C | D | E | F |
| --- | --- | --- | --- | --- | --- | --- |
| Type of resin Y | TP | TP | — | TP | A | TP |
| Y/X ratio | 1/2 | 1/5 | 0 | 1/2 | 1/2 | 1/2 |
| Peel strength (N/cm) | 14 | 26 | 28 | 36 | 18 | 45 |
| Dynamic shear (N/cm$^2$) | 26 | 16 | 34 | 32 | 29 | 12 |
| Tack | xx | xx | xx | xx | xx | xx |

We claim:
1. A thermoplastic pressure-sensitive adhesive composition comprising as essential elements:
   (1) 100 parts of a shock absorbing and adhesion improving styrene-isoprene-styrene block copolymer having a melt index of 0.2 to 22 g per 10 minutes;
   (2) 50 to 800 parts of a tackifying resinous constituent consisting of:
      (a) 50 up to 500 parts of aliphatic hydrocarbon resin, having a softening point (ring and ball) of about 100° C., and
      (b) 0 to 300 parts of C$_8$-aromatic resin, or terpenephenolic resin, or a combination thereof, having a softening point (ring and ball) of up to 200° C.,
   (3) 1 to 300 parts of a copolyetheresteramide consisting of a product resulting from the polycondensation of an α,ω-dicarboxylic polyamide or copolyamide having a number average molecular weight of 300 to 15,000, employed in an amount of 90 to 5% by weight and of an aliphatic α, ω-dihydroxylated polyoxyalkylene having a number average molecular weight of 100 to 6,000, employed in an amount of 10 to 95% by weight, the said polycondensation product having a softening point (ring and ball) of between 80° and 210° C. and a viscosity in the molten state of 10 to 2,000 Pa.s at 200° C.;
   (4) up to 200 parts of tackifying naphthenic oil;
   (5) up to 300 parts of fillers.
2. The thermoplastic pressure-sensitive adhesive composition of claim 1 in the form of a hot melt adhesive for bonding articles to panels of automobiles.

* * * * *